Patented Sept. 19, 1950

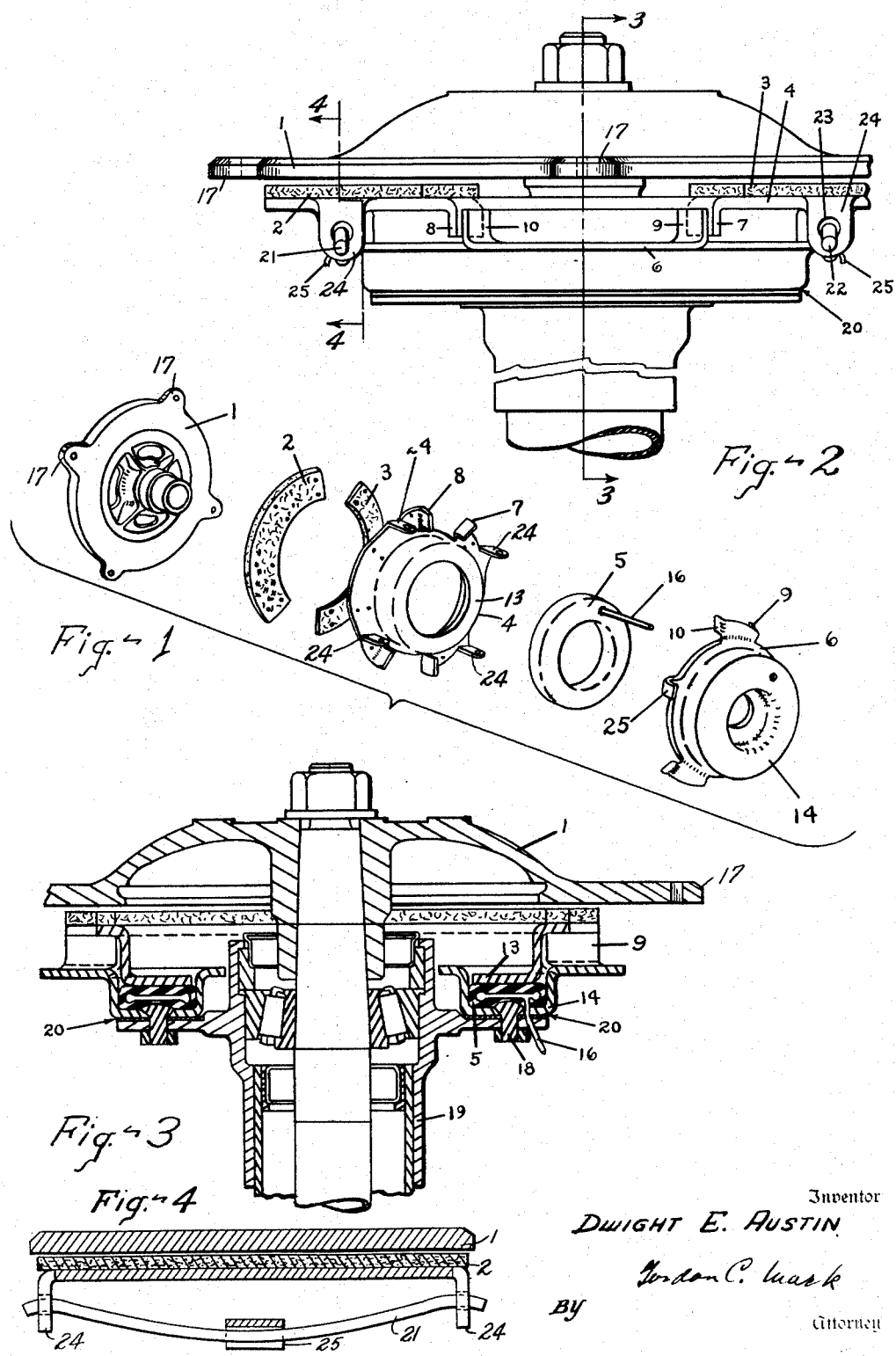

2,522,809

UNITED STATES PATENT OFFICE 2,522,809

AXIALLY ENGAGING FLUID PRESSURE BRAKE

Dwight E. Austin, Kent, Ohio

Application February 19, 1946, Serial No. 648,675

4 Claims. (Cl. 188—152)

This invention relates to a new fluid brake designed for use particularly on automobile wheels and the like, but suitable for more general application.

The fluid brakes now in use, although generally satisfactory, have been found objectionable for certain applications because of the difficulty of suitably dissipating the heat generated during the braking operation. The heat has had a deteriorating effect on the inflatable means used for applying the braking pressure, and this has led to disastrous results when this inflatable means has deteriorated to the point that it no longer holds up when pressure is applied. The brake of this invention is designed to overcome this disadvantage and incorporates various novel features.

In the first place, the friction lining is not made continuous, and the portion of the brake shoe to which it is fastened is not made continuous. Thus, the annular braking surface of the wheel against which the friction lining is pressed and which is heated during the braking operation is exposed to the atmosphere between the portions of the brake shoe which support the lining, and the portion thus exposed is continuously changed as the wheel rotates. This greatly facilitates dissipation of the heat generated by braking. In a preferred form of the invention the brake lining and the portion of the brake shoe to which it is attached are formed as two or more segments equally spaced around the axis of the wheel.

Furthermore, according to this invention the inflatable means used to apply the braking pressure does not contact the back of that portion of the brake shoe to which the linings are attached, as is customary; but the pressure is applied to a portion of the shoe somewhat removed from that to which the linings are attached, and the expander tube, therefore, is not heated to the high temperature to which it would be heated if pressed directly against the back side of that portion of the shoe to which the linings are attached. Various novel features of the invention will be apparent as the description proceeds.

In the drawings:

Fig. 1 is an exploded view showing certain of the essential parts of the new fluid brake;

Fig. 2 is a side view of the assembled brake; and

Figure 3 is a section along the line 3—3 of Figure 2, and Figure 4 is a section along the line 4—4 of Figure 2.

In Fig. 1 the following parts are shown in spaced relation to one another: the wheel or disc 1, the brake linings 2 and 3, the brake shoe 4, the expander tube 5, and the anchor plate 6. The brake shoe and brake linings are not continuous but are divided into two sections which cover a total of about two-thirds or three-fourths of the annular braking surface of the wheel or disc. The openings between these sections of the brake shoe to which the linings are attached expose to the atmosphere the portions of the wheel or disc lying directly under them which are heated directly by contact with the linings during the braking operation. As the wheel rotates, all sections of this annular portion of the wheel are exposed to the atmosphere.

There are flanges on the brake shoe at each end of each of the sections to which the lining is attached. These cooperate with a like number of flanges on the anchor plate to keep the brake shoe from turning. All of these flanges are substantially radial to the axis of the wheel and are at least about as wide as the portion of the brake shoe to which the linings are attached. Flanges so constructed fan the exposed surface of the wheel as it rotates. The flanges on the brake shoe are advantageously formed from continuations of the portion of the annular portion of the shoe to which the linings are attached by bending them away from the linings. The flanges on the anchor plate are preferably similarly formed by bending back continuations of portions of the anchor plate which extend outwardly from the rim thereof and bridge the spacings between the portions of the brake shoe to which the linings are attached. As illustrated, the two flanges 7 and 8 of the brake shoe cooperate with the flanges 9 and 10 of the anchor plate 6, and the other two shoe flanges cooperate with other like anchor-plate flanges. Fig. 3 is a view taken at an angle of 90° to the view shown in Fig. 2 so that the flanges identified in Fig. 2 are shown only partially in Fig. 3 and are not shown in the center of Fig. 3 but at the side.

It is customary for the inflatable member to press against the back side of that surface of the brake shoe to which the friction linings are fastened. This is the hottest part of the brake shoe, and the heat has had a detrimental effect on the rubber (natural or synthetic) of which the inflatable member is composed. In the present design, the inflatable member or expander tube 5 rests on the offset flange 13, which is built up inside the brake shoe and is removed somewhat from the hottest part of the brake shoe. It is enclosed by the cup-shaped portion 14 of the anchor plate. Air, oil or other suitable fluid is introduced and withdrawn from the expander tube, as required, through the connection 16 and appropriate valve means.

The edge of the wheel is provided with several lugs 17. The anchor plate is bolted by the bolts 18 to the axle housing 19 which may be of any suitable design. Shims 20 are inserted from time to time to compensate for the wear of the linings. Other suitable means for this purpose may be used instead of the shims.

The brake shoe and anchor plate are held together by the rods or bars 21 and 22 which are formed of stiff spring steel. These fit through the holes 23 in lugs 24 on the brake shoe and under the hooks 25 on opposite sides of the anchor plate. Thus, the expander tube 5 is inflated against the pressure of these springs, and when the pressure in the expander tube is released, the springs deflate it. The expansion of the expander tube forces the brake linings 2 and 3 against the braking surface of the wheel 1. The pressure is such as to bring the wheel to a quick stop, but this generates very considerable heat. To help dissipate the heat, the brake linings 2 and 3 are mere arc sections, and the surrounding atmosphere and air currents contact the braking surface of the wheel between the ends of these sections during the braking operation and thereafter. This facilitates dissipation of the heat. Furthermore, as clearly illustrated, the expander tube 5 does not rest on the back side of that surface of the brake shoe to which the linings are attached but is offset from it so that it is not raised to the temperature to which it would be heated if it were located on the opposite side of the brake shoe from the brake lining. This arrangement requires a smaller inflatable tube than is normally required, and this smaller tube uses less fluid than a tube of the usual size.

The fluid brake of this invention is, therefore, designed to protect the expander tube from the heat generated on braking. This extends the life of the expander tube and eliminates the hazard which is always present when such tubes are subjected to the decomposing influences of the high temperatures generated in certain braking operations, such as on automobiles and light trucks, etc. Air, oil or the like may be used as the braking fluid. Various modifications may be made in the design without departing from the scope of the invention as defined in the appended claims.

What I claim is:

1. A fluid brake composed of a brake shoe having arcuate sections with linings attached thereto, an anchor plate forming with the brake shoe a chamber for an expander tube, an expander tube in the chamber, the brake linings and said sections of the shoe to which they are attached having spaces between them so that air has access through the spaces to facilitate the dissipation of heat, continuations of said sections of the shoe being bent away from the linings and flanges on said anchor plate to cooperate with said bent continuations of the brake shoe to prevent rotation thereof.

2. A fluid brake composed of a brake shoe having spaced arcuate sections with linings attached thereto, an anchor plate forming with the brake shoe a chamber for an expander tube, the rim of the anchor plate extending outwardly therefrom, an expander tube in the chamber, a flange at each end of each of said arcuate sections of the shoe which extends toward the anchor plate, portions of the rim of the anchor plate bridging the spaces between the arcuate sections of the brake shoe and a flange at each end of each portion which extends toward the brake shoe and is adapted to interlock with one of said flanges on the brake shoe.

3. A fluid brake composed of a brake shoe having spaced arcuate sections with friction linings attached thereto and having an annular portion which is offset inwardly from said sections and which is in a different plane from the said sections and spaced away from the linings, an anchor plate having an annular cupped portion to receive an expander tube and a rim extending outwardly from said cupped portion, a rubber expander tube for actuating the brake enclosed between the annular cupped portion of the anchor plate and said annular portion of the brake shoe, a flange at each end of each of said arcuate sections of the brake shoe which flange is bent toward the anchor plate, and flanges bent outwardly from the rim of the anchor plate adapted to be interlocked with respective flanges of the brake shoe to prevent rotation of the brake shoe.

4. A fluid brake for a wheel or disc having an annular braking surface, which brake comprises a brake shoe having a rim portion with a brake lining attached thereto and lugs protruding outwardly from the rim portion away from the brake lining, an anchor plate having an annular cupped portion to receive an inflatable member and lugs extending outwardly from the rim thereof, an inflatable member positioned in the annular cupped portion and which on inflation is adapted to move the brake shoe toward said braking surface, and an elongate spring interlocked with at least some of the aforesaid lugs to couple the brake shoe to the anchor plate and to resist said movement of the brake shoe.

DWIGHT E. AUSTIN.

REFERENCES CITED

The following references are of record in the file of this patent:

UNITED STATES PATENTS

| Number | Name | Date |
| --- | --- | --- |
| 1,506,930 | Haselnaier | Sept. 2, 1924 |
| 1,658,812 | Mitton | Feb. 14, 1928 |
| 1,679,495 | Rainsford | Aug. 7, 1928 |
| 1,982,235 | Shephard | Nov. 27, 1934 |
| 2,001,599 | Cohen | May 14, 1935 |
| 2,157,473 | Best | May 9, 1939 |
| 2,302,495 | Freer | Nov. 17, 1942 |
| 2,384,297 | Goepfrich | Sept. 4, 1945 |
| 2,386,477 | Kraft | Oct. 9, 1945 |